United States Patent [19]

Stech

[11] Patent Number: 5,377,736

[45] Date of Patent: Jan. 3, 1995

[54] DRIVEN AXLE VEHICLE INFLATION SYSTEM

[75] Inventor: Clyde G. Stech, LaGrange, Tex.

[73] Assignee: MARKS-RMS, Inc., Corpus Christi, Tex.

[21] Appl. No.: 154,066

[22] Filed: Nov. 18, 1993

[51] Int. Cl.⁶ .............................................. B60C 23/00
[52] U.S. Cl. ................................... 152/417; 152/415; 277/31; 277/167.3; 277/201
[58] Field of Search ............ 152/415, 416, 417; 277/31, 167.3, 201

[56] References Cited

U.S. PATENT DOCUMENTS

| | | | |
|---|---|---|---|
| 693,747 | 2/1902 | Sinnott | 152/417 |
| 2,976,906 | 3/1961 | Kamm et al. | 152/417 |
| 3,705,614 | 12/1972 | Juttner et al. | 152/417 |
| 3,760,859 | 9/1973 | Shahan et al. | 152/417 |
| 4,582,107 | 4/1986 | Scully | 152/415 X |
| 4,685,501 | 8/1987 | Williams | 152/417 |
| 4,844,138 | 7/1989 | Kokubu | 152/417 |
| 4,883,106 | 11/1989 | Schultz et al. | 152/417 |
| 5,080,156 | 1/1992 | Bartos | 152/417 |
| 5,080,157 | 1/1992 | Oerter | 152/417 |
| 5,174,839 | 12/1992 | Schultz et al. | 152/415 |

Primary Examiner—Caleb Weston
Assistant Examiner—Francis J. Lorin
Attorney, Agent, or Firm—Fulbright & Jaworski

[57] ABSTRACT

An air inflation system for tires on a vehicle having at least one driven axle in which the axle includes a longitudinal extending air passageway connected to each tire at the end of the axle and a rotatable air coupling connected between an air line and the air passageway. The coupling includes a stationary tubular sleeve surrounding the axle and first and second seals, respectively, at opposite ends of the sleeve in which the seals rotate with the axle and sealingly engage the axle. The seals are biased into engagement with the sleeve. Preferably, the ends of the sleeve and the coacting seals include beveled sealing surfaces.

4 Claims, 3 Drawing Sheets

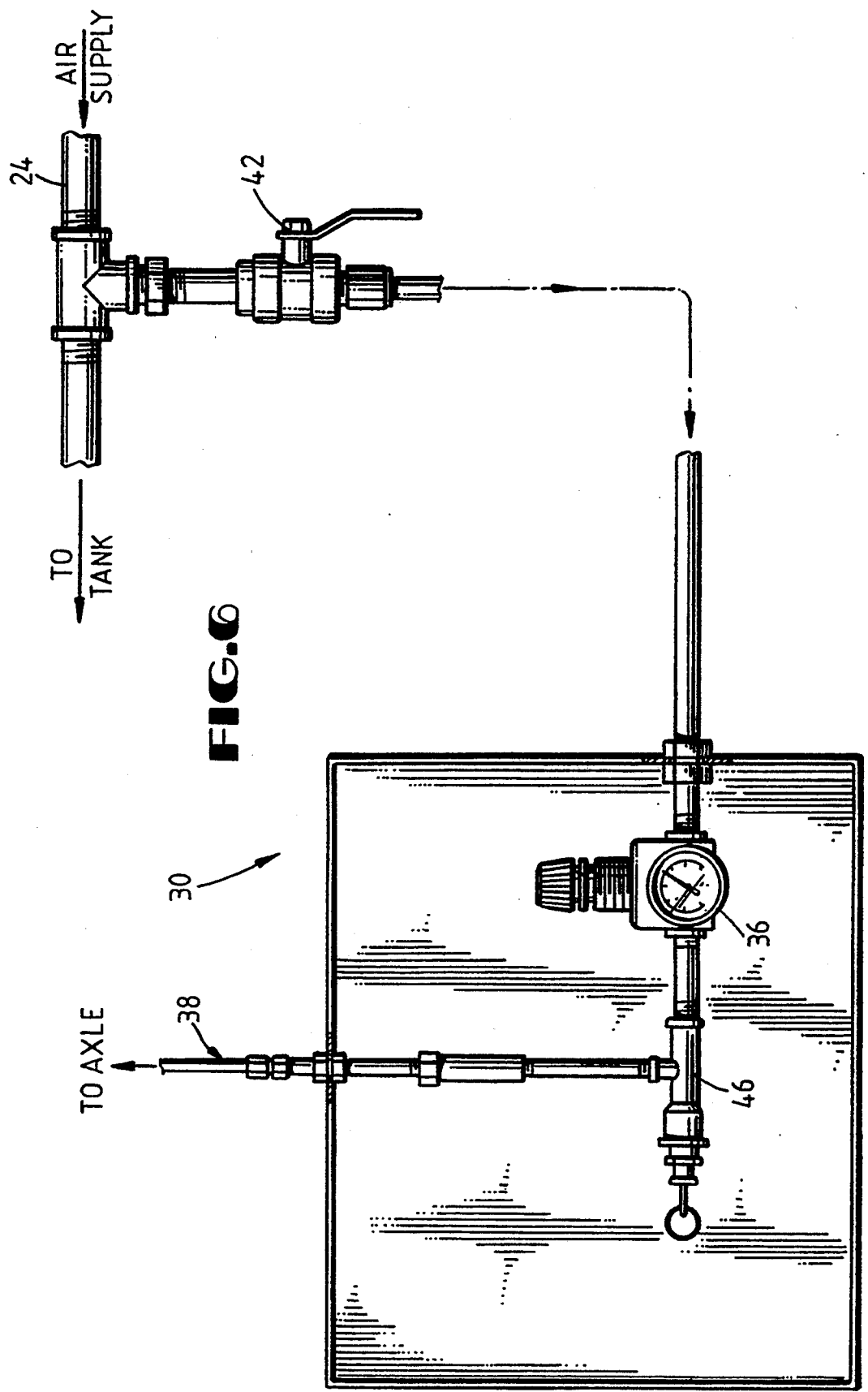

5,377,736

DRIVEN AXLE VEHICLE INFLATION SYSTEM

BACKGROUND OF THE INVENTION

The present invention relates to a central tire inflation system and in particular to such an air inflation system for supplying air through a driven axle of a vehicle through a rotatable coupling.

It is known that tires on a vehicle, such as a truck trailer, should be properly inflated for ease of control of the vehicle, its safety, and to provide even wear and long life of the expensive tires. Various types of central tire inflation systems (CTIS) have been suggested in the past. However, one of the problems is to supply the air from a stationary air control system through a rotatable and sealable coupling for allowing rotation of the vehicle wheels while connected to the air control system.

The present invention is particularly useful for providing a rotatable air coupling for supplying air through the driven axle of a vehicle to tires thereon.

SUMMARY

The present invention is directed to an air inflation system for tires on a vehicle having at least one driven axle with at least one pneumatic tire at each end of each axle in which the vehicle includes an air supply. The system includes an air line connected to the air supply and the axle includes a longitudinally extending air passageway therein and a radially extending air passage connected to the longitudinal passage and extending out of the side of the axle. An air connection is provided between the longitudinal air passageway and each tire at the end of the axle. A rotatable air coupling is connected between the air line and the radially extending air passageway and includes a stationary tubular sleeve surrounding the axle and having a port in fluid communication with the air line. First and second seal means are respectively positioned at and seal against opposite ends of the sleeve. The first and second seal means are rotatable with the axle and sealingly engage the axle. Means are provided biasing the first and second seal means into sealing engagement with the sleeve.

Yet a still further object is wherein the inside of the tubular sleeve is spaced from the exterior of the axle.

A still further object is wherein the first and second seal means include beveled sealing surfaces and the ends of the sleeve include coacting beveled ends whereby the sleeve is supported off of the axle.

Yet a further object is wherein the biasing means include first and second rings respectively positioned adjacent to and connected to the first and second sealing means. The rings are secured to and rotate with the axle and spring means are positioned between the first and second rings and the first and second seal means, respectively. Yet a further object of the present invention is wherein the sleeve is metal and the seal means include graphite sealing surfaces.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 6 is a an enlarged elevational view illustrating the control system of the present invention.

DESCRIPTION OF THE PREFERRED EMBODIMENT

While the present invention will be described in use as employing the central tire inflation system similar to that described in copending patent application, Ser. No. 07/951,297, filed Sep. 22, 1992, entitled Air Control System for Pneumatic Tires on a Vehicle, now U.S. Pat. No. 5,287,906 and which is incorporated herein by reference, for convenience, it is to be understood that the present invention may be used with other and various types of central tire inflation systems.

Figure 1:
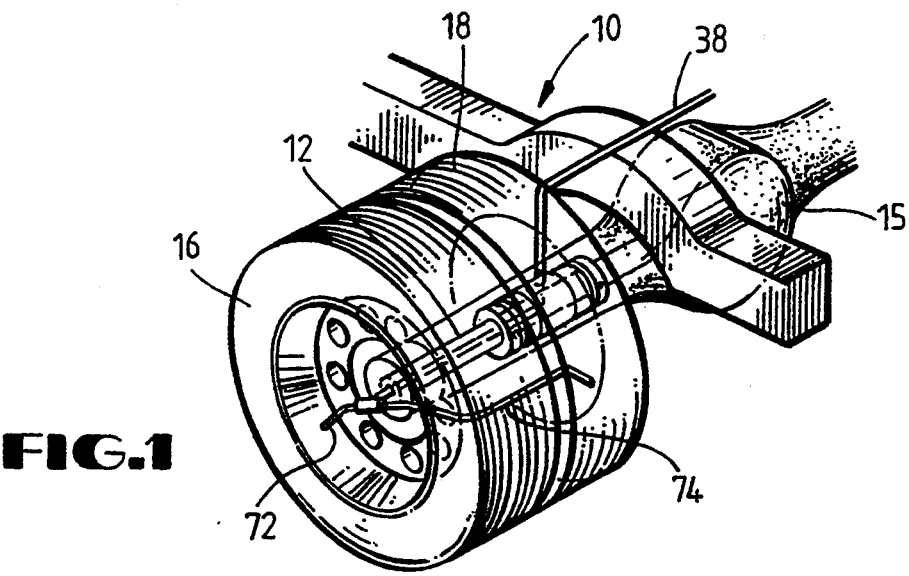
FIG. 1 is a fragmentary, perspective elevational view of the present invention installed in a truck-trailer.
Figure 2:
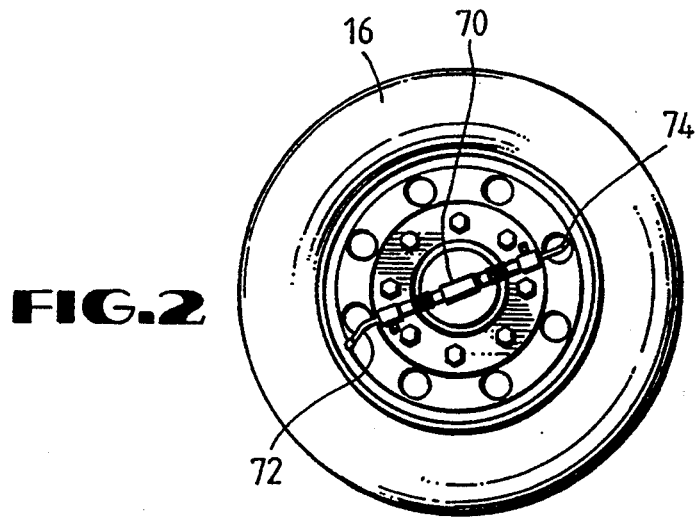
FIG. 2 is an end elevational view illustrating the connection of the air control system to the two tires of FIG. 1.

Referring now to the drawings, and particularly to FIG. 1, the reference numeral 10 generally indicates a conventional vehicle, such as an eighteen wheel truck-trailer, having a plurality of axles, only one of which, such as driven axle 12 driven by a differential 15, is shown with wheels having pneumatic tires. Thus, axle 12 includes two tires 16 and 18. Such a vehicle 10 also includes an air supply line 24 (FIG. 6) from a pump and air tank (not shown) for supplying air pressure to the brakes on the vehicle 10.

The above description of a vehicle 10 with pneumatic tires and a conventional air supply system is well known. The present invention is directed to providing an air control system 30 which is continuously connected to the pneumatic tires including the tires 16 an 18 on the vehicle 10 to provide an equal pressure thereby improving the safety of the vehicle 10 and operator, and to provide even and long life of the expensive tires. In particular, the air control system of the present invention is directed to providing air to each tire from the fixed air control system 30 through a rotatable coupling for allowing rotation of the tires such as 16 and 18 while connected to the air control system 30, and further to provide such a system through the driven axles, such as 12, of the vehicle 10.

Referring to FIG. 6, the air control system includes the air supply 24 which may have 120 psi air pressure, which may be connected to a manual off-on valve 42 for connecting or disconnecting the air control system, and a regulator 36. The air pressure regulator may be of any conventional type and is typically set at between 100-110 psi cold setting as this is the normal air pressure carried in the truck-trailer tires of an eighteen wheeler truck-trailer. One satisfactory type of air regulator is Model 56-110 sold by Air Dirco. The system 30 may include an unloader valve 46 which is normally open but closes in the event that the output air pressure from the pressure regulator 36 falls below a predetermined value. The unloader valve is normally open for supplying air to all of the tires and has a predetermined set point pressure lower than the predetermined outlet pressure and the unloader valve closes on a drop in outlet pressure of the air supply below the predetermined set point thereby shutting off air to all of the tires for preventing further loss of air from the air supply and opens upon an increase in outlet pressure of the air supply above the predetermined set point. This prevents loss of supply air thereby protecting the air supply 24 and allowing it to maintain sufficient air pressure to actuate the air brakes on the vehicle 10. One suitable unloader valve is No. 3X818, sold by Control Devices, Inc. The air line 38 provides the outlet air from the control system 30 to all of the tires.

Referring now to FIGS. 1-5, the means for providing air from the stationary control system 30 to the rotating wheels through a driven axle 12 is best seen. First, the axle 12 includes a coaxially longitudinally extending air passage 20 therein extending from the end 21 of the axle 12 to preferably midway through the axle 12. There, a radially extending air passage 13 is connected to the longitudinal passageway 20 and extends out of the side of the driven axle 12.

Figure 3:
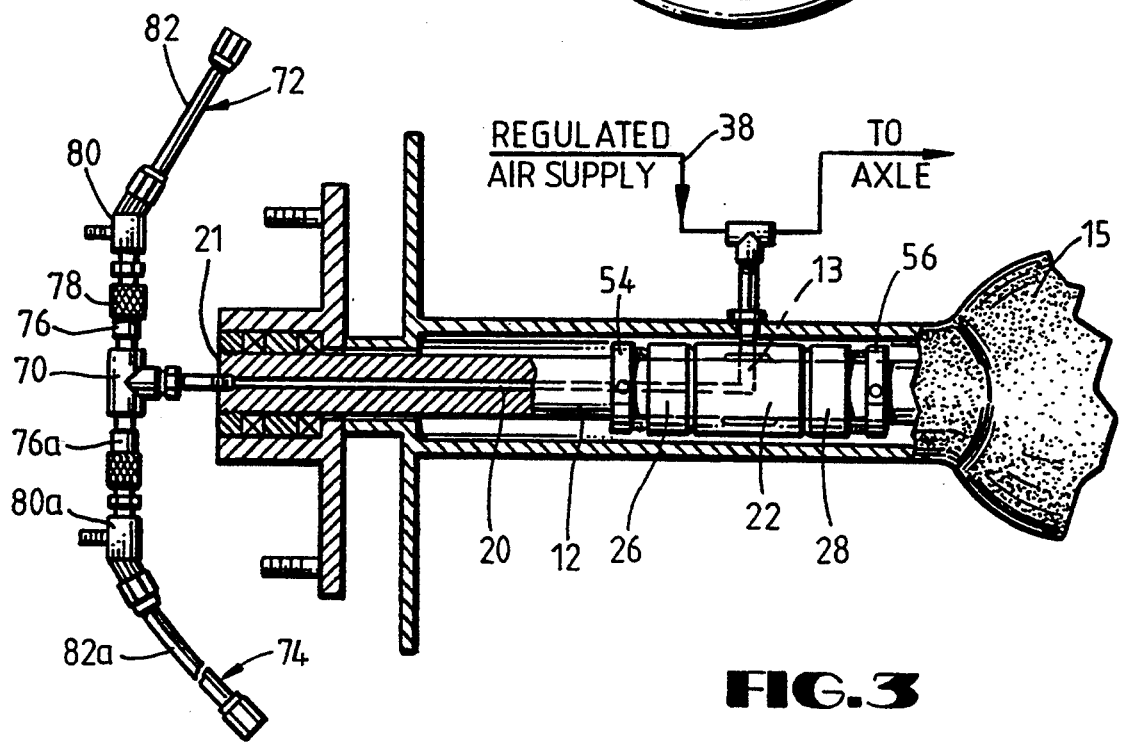
FIG. 3 is an enlarged fragmentary elevational view, in cross section, illustrating the air connection through a driven axle.
Figure 4:
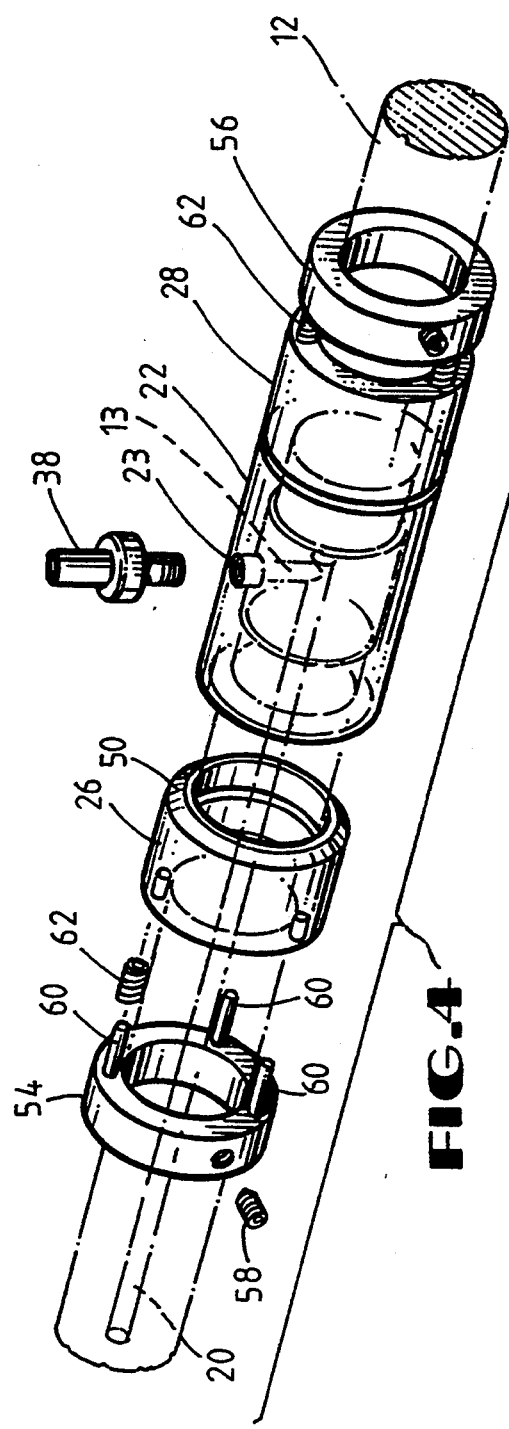
FIG. 4 is an enlarged, exploded and fragmentary elevational view of the rotatable air coupling of the present invention.
Figure 5:
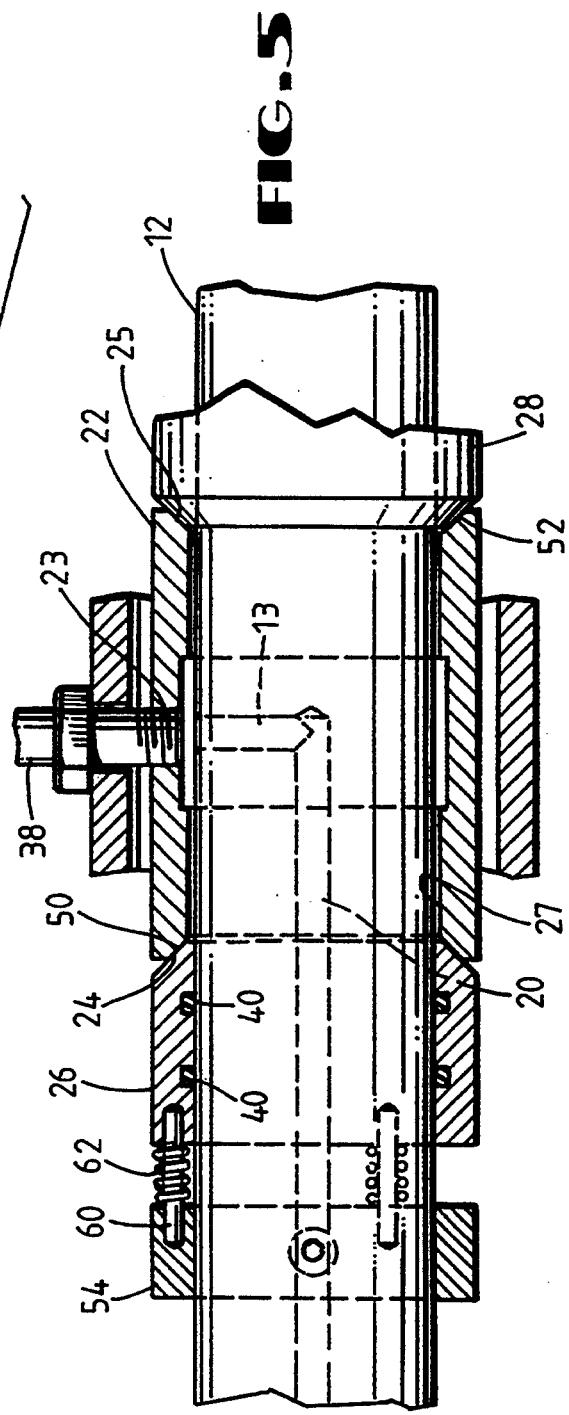
FIG. 5 is a fragmentary enlarged, cross-sectional view, of the air coupling of FIG. 4.

A rotatable air coupling is connected between the air line 38 and the radially extending air passageway 13. As best seen in FIGS. 3, 4 and 5, the rotatable air coupling generally includes a stationary tubular sleeve 22 surrounding the driven axle 12 and having a port 23 in fluid communication with the air line 38. Preferably, the tubular sleeve 22 has an interior 27 spaced from the exterior of the driven axle 12 and is supported from the vehicle 10 by the air line connection 38. Preferably, the sleeve 22 is metal and includes beveled ends 24 and 25, preferably hardened with a mirror finish. A first seal means 26 and a second seal means 28 are respectively positioned at opposite ends of the sleeve 22 and rotate with the axle 12 and sealingly engage the axle 12 such as by O-rings 40. The seal means 26 and 28 include beveled sealing surfaces 50 and 52 for coacting with the beveled surfaces 24 and 25, respectively, of the sleeve 22. Preferably, the beveled sealing surfaces 50 and 52 are of a good sealing but slidable surface such as graphite. The coacting beveled surfaces 50, 52, 24 and 25 act to center and support the sleeve 22 off of the axle 12.

Suitable means are provided for rotating the seal means 26 and 28 with the axle 12. Thus, rings 54 and 56 encircle the axle 12 and are secured thereto such a by Allenhead screws 58, which may be adjusted for wear as required, to the axle 12 and are interconnected with the seal means 26 and 28, respectively, by pins 60. In addition, biasing means are provided acting on the first and second rotating seal means 26 and 28 for urging them into a sealing engagement with the sleeve 22. Thus, springs 62 may be provided between the ring 54 and seal 26 and between the ring 56 and the seal means 28. Air from the control system 30 passes to line 38 which is in communication with the interior of the sleeve 22 to the port 23 and thus in communication with the air passageways 13 and 20 for supplying air to the tires 16 and 18. While the sleeve 22 is stationary, the rotating sleeves 26 and 28 maintain a sealing engagement with the opposite ends of the sleeve 22 as well as a sealing engagement with the exterior of the driven axle 12 to provide a long lasting rotating air coupling.

A suitable air connection is provided between the longitudinal air passageway 20 in the driven axle 12 and each tire 16 and 18 at the end of the axle 12 such as the connections disclosed in copending patent application Ser. No. 07/951,297. Thus, referring now to FIGS. 1-3, the air connection includes a tee 70 having a first 72 and a second 74 similar tire connections for two tires, such as 16 and 18. Thus, connected to the outer tire, such as tire 16, is a connection 51 consisting preferably of a male 76 and female 78 connectible and disconnectible coupling for conveniently disconnecting the tire 16 from the system 30 for repair or replacement. Also, the tire connection 72 includes a pressure test valve stem 80 for testing the air in the tire 16. A flexible hose 82 completes the connection 51 to the valve stem of the outside of the tire 16. Preferably, a conventional check valve, such as Model MJCV-1, sold by Control Devices, Inc. is included in the male connector 76. Tire connection 74 to the inside wheel 18 is also connected to the tee 54 and includes similar parts to those in the tire connection to the tire 16 which are similarly numbered with the addition of the suffix "a".

In use, the air control system of the present invention is installed in a vehicle 10 as described. The hand valve 42 is opened and air from the vehicle air supply 24 is supplied to the pressure regulator 36 and will flow through the air line 38 to the rotatable air coupling to the passageways 13 and 20 in the driven axle 12 and continuously supply air to all of the tires connected to the driven axle, such as 16 and 18.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skill in the art and which are encompassed within the spirit of the invention and the scope of the appended claims.

What is claimed is:

1. An air inflation system for tires on a vehicle having at least one driven axle with at least one pneumatic tire at each end of each axle and said vehicle having an air supply comprising, an air line connected to the air supply, said axle including a longitudinally extending air passageway therein, and a radially extending air passageway connected to the longitudinal passageway and extending out of the side of the axle, an air connection between the longitudinal air passageway and at least one tire at the end of the axle, and a rotatable air coupling connected between the air line and the radially extending air passageway including, a stationary tubular sleeve surrounding the axle and having first and second ends and having a port in fluid communication between the air line and the radially extending air passageway, first and second seal means positioned at and sealing against the first and second ends, respectively, of the sleeve, said first and second seal means rotatable with the axle and sealingly engaging the axle, said first and second seal means each including a longitudinally movable tubular member surrounding the axle and coaxially aligned with the sleeve, and said first and second seal means include beveled sealing surfaces and the ends of the sleeve include coacting beveled ends, and spring means biasing the first and second seal means into sealing engagement with the first and second ends of the sleeve.

2. The system of claim 1 wherein the inside of the tubular sleeve is spaced from the exterior of the axle.

3. The system of claim 1 wherein the biasing means includes first and second rings respectively positioned adjacent to and connected to the first and second sealing means, said rings secured to and rotate with the axle and said spring means are positioned between the first and second rings and the first and second sealing means, respectively.

4. The system of claim 1 wherein the sleeve is metal and sealing means include graphite sealing surfaces.

* * * * *